US011802578B1

(12) United States Patent
Gates et al.

(10) Patent No.: US 11,802,578 B1
(45) Date of Patent: Oct. 31, 2023

(54) ARTICLE CUSHIONING INTERFACE AND RELATED METHODS

(71) Applicant: All Rite Products, Inc., Riverton, UT (US)

(72) Inventors: Travis D. Gates, Riverton, UT (US); Stacey L. Gates, Riverton, UT (US); Jason Tubbs, North Ogden, UT (US)

(73) Assignee: All Rite Products, Inc., Riverton, UT (US)

( * ) Notice: Subject to any disclaimer, the term of this patent is extended or adjusted under 35 U.S.C. 154(b) by 1 day.

(21) Appl. No.: 17/858,799

(22) Filed: Jul. 6, 2022

(51) Int. Cl.
| | |
|---|---|
| *F16L 3/04* | (2006.01) |
| *F16B 2/00* | (2006.01) |
| *F16B 2/06* | (2006.01) |
| *B60R 11/00* | (2006.01) |
| *F16L 3/10* | (2006.01) |
| *F16L 3/12* | (2006.01) |

(52) U.S. Cl.
CPC .............. *F16B 2/065* (2013.01); *B60R 11/00* (2013.01); *F16B 2/005* (2013.01); *B60R 2011/0071* (2013.01); *F16L 3/04* (2013.01); *F16L 3/1091* (2013.01); *F16L 3/12* (2013.01)

(58) Field of Classification Search
CPC ... F16L 3/04; F16L 3/12; F16L 3/1207; F16L 3/1091; F16B 2/00; F16B 2/065; F16B 2/005; B60R 2011/0071; B60R 11/00
See application file for complete search history.

(56) References Cited

U.S. PATENT DOCUMENTS

| | | | | |
|---|---|---|---|---|
| 4,506,418 A | * | 3/1985 | Viola ................... | F01N 13/1855 24/284 |
| 5,014,940 A | * | 5/1991 | Sherman ................... | F16L 3/04 248/62 |
| 5,215,281 A | * | 6/1993 | Sherman ............... | F16L 55/035 248/62 |

(Continued)

FOREIGN PATENT DOCUMENTS

WO    WO-2007078241 A1 * 7/2007 ................ F16L 3/04

OTHER PUBLICATIONS

Gear America, Mega Shackle Isolators: Help Prevent Corrosion and Protect Your Finishes, Sep. 6, 2022, 4 pages, https://www.gearamerica.com/products/mega-shackle-isolators-2pk-help-prevent-corrosion-and-protect-your-finishes ?_pos=1&_sid=e6cfeba3a&_ss=r.

(Continued)

*Primary Examiner* — Tan Le
(74) *Attorney, Agent, or Firm* — Jason R. Jones

(57) ABSTRACT

An article cushion is provided, including a body formed from a resilient material and an elongate channel defined in the body. At least one openable bracket has a pair of pliable, openable arms that terminate in a receiving gap. The receiving gap has a width smaller than a cross-section of the clasp. The clasp is insertable transversely through the receiving gap when the openable arms are in a splayed configuration, with the openable arms securing the clasp therebetween when the open arms are in a relaxed configuration. At least one closed bracket has a pair of pliable, closed arms that terminate in a restraining area. The restraining area is sized and shaped to prevent transverse insertion or extraction of the clasp through the restraining area, the clasp being axially moveable through closed arms when the closed arms are in a relaxed configuration.

20 Claims, 3 Drawing Sheets

(56) References Cited

U.S. PATENT DOCUMENTS

| | | | | |
|---|---|---|---|---|
| 7,100,808 | B2* | 9/2006 | Hancock | F16L 3/10 |
| | | | | 224/567 |
| 7,549,307 | B2* | 6/2009 | Bistline | E05B 73/007 |
| | | | | 224/315 |
| 2004/0056158 | A1* | 3/2004 | Stuart | F16L 3/13 |
| | | | | 248/74.2 |

OTHER PUBLICATIONS

Rhino USA, D-Ring Shackle Isolators, Sep. 6, 2022, 2 pages, https://www.rhinousainc.com/products/d-ring-shackle-isolators?_pos=2&_psq=d-ring&_ss=e&_v=1.0.

Autmatch, Autmatch ¾" D Ring Shackle (2 pack) 41,887lb Break Strength with ⅞" Screw Pin and Isolator & Washer Kit Red & Black, Sep. 6, 2022, 1 page, https://www.autmatch.com/collections/3-4-shackle-suit/products/autmatch-shackles-3-4-d-ring-shackle-2-pack-41-887ib-break-strength-with-7-8-screw-pin-and-shackle-isolator-washers-kit-for-tow-strap-winch-off-road-towing-jeep-vehicle-recovery-red-black.

* cited by examiner

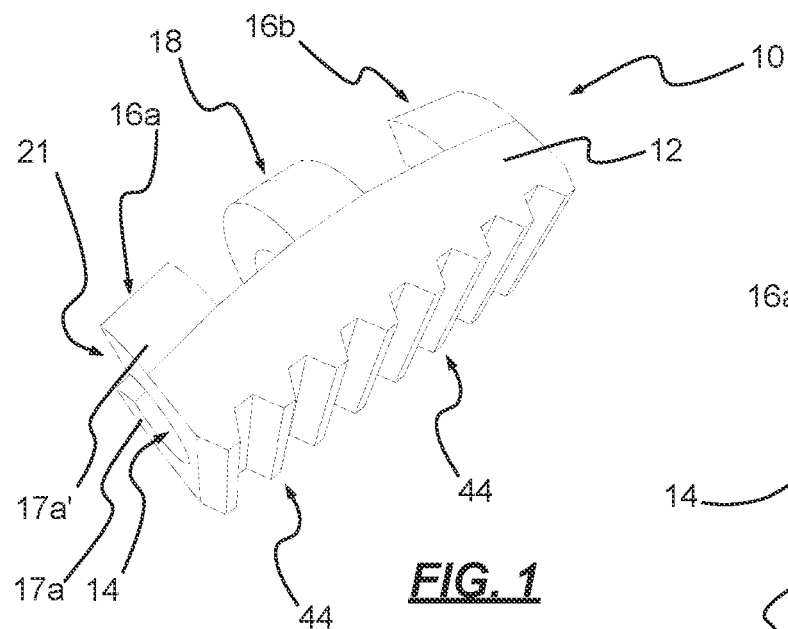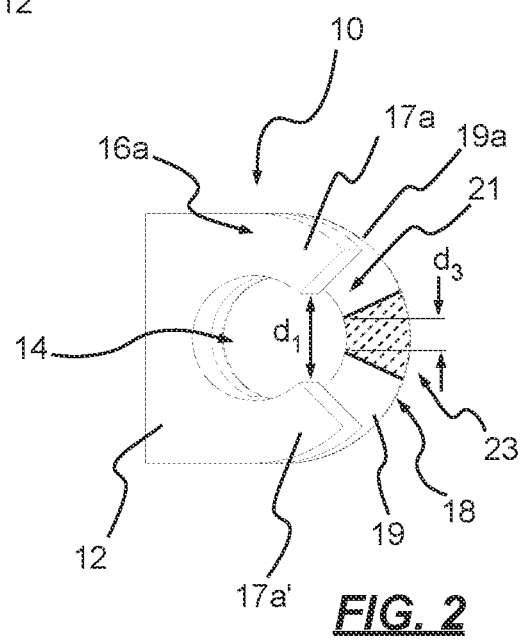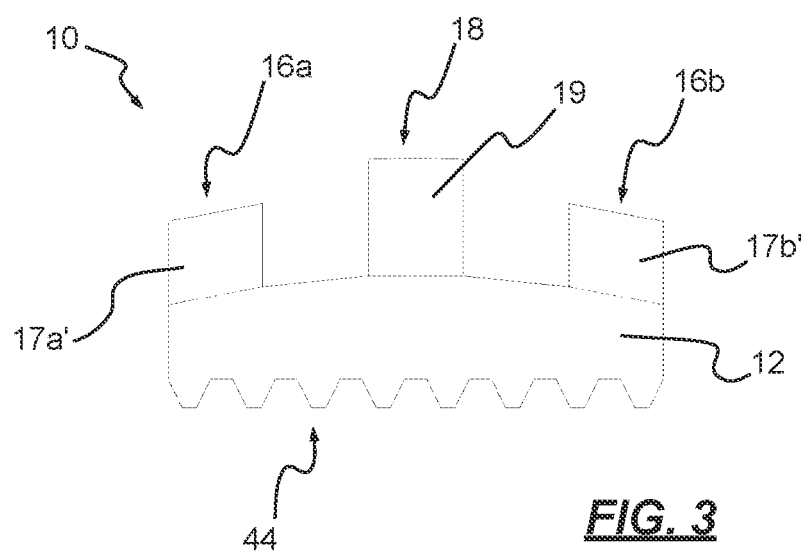

ARTICLE CUSHIONING INTERFACE AND RELATED METHODS

BACKGROUND OF THE INVENTION

Field of the Invention

The present technology relates generally to systems for cushioning the interface between two rigid objects. In particular, the present technology relates to cushioning the interface between a U-shaped article attachable to a target component.

Related Art

In many industrial applications, a U-shaped device is utilized to secure one article to another. For example holding devices, or article holders, for use on vehicles have been utilized for many years to allow operators of the vehicles to transport various articles on the vehicle. Article holders such as those disclosed in U.S. Pat. No. 4,607,772 have been used to carry hunting and fishing equipment, tools, etc., on motorcycles, snowmobiles, ATVs, UTVs, side-by-side vehicles, bicycles, all-terrain vehicles and other vehicles. As it is desired to attach most such devices to a specific component of the vehicle, such as the handlebars, storage racks, roll cages, etc., they are in many cases attached to such component using a metallic U-bolt. While such interfaces can in most cases be very tightly secured in position, it is sometimes the case that the component of the vehicle is scratched or visibly blemished during such operations.

Other common industrial applications, such as securing clasp locks or shackles to a device, can also risk scratching or damaging the component to which the clasp or shackle is attached.

While cushioning interfaces or isolators have been developed to provide a pliable interface between two metallic components such as these, conventional approaches have provided devices which are either very difficult to interchange, or do not remain in a desired position, once installed.

SUMMARY OF THE INVENTION

In accordance with one aspect of the invention, an attachment assembly is provided, including a substantially rigid clasp having a seat and a substantially rigid target component, receivable within the seat of the clasp. An article cushion can include a body formed from a resilient material. An elongate channel can be defined in the body, the channel sized to receive therein a portion of the seat of the clasp. At least one openable bracket can have a pair of pliable, openable arms extending away from the channel toward distal ends that terminate in a receiving gap, the receiving gap having a width smaller than a cross-section of the clasp. The clasp can be insertable transversely through the receiving gap when the openable arms are in a splayed configuration, with the openable arms securing the clasp therebetween when the open arms are in a relaxed configuration. At least one closed bracket can have a pair of pliable, closed arms extending away from the channel toward distal ends that terminate in a restraining area. The restraining area can be sized and shaped to prevent transverse insertion or extraction of the clasp through the restraining area. The restraining area can include the arms being coupled to one another, or formed integrally with one another. The clasp can be axially moveable through the closed arms when the closed arms are in a relaxed configuration. The article cushion is thus positionable in the seat area of the clasp to provide a cushioned interface between the seat area of the clasp and the article.

In accordance with another aspect of the technology, an article cushion is provided, including a body formed from a resilient material with an elongate channel defined in the body. The channel can be sized to receive therein a portion of a seat of a substantially rigid clasp. At least one openable bracket can have a pair of pliable, openable arms extending away from the channel toward distal ends that terminate in a receiving gap. The receiving gap can have a width smaller than a cross-section of the clasp. The clasp can be insertable transversely through the receiving gap when the openable arms are in a splayed configuration, with the openable arms securing the clasp therebetween when the open arms are in a relaxed configuration. At least one closed bracket can have a pair of pliable, closed arms extending away from the channel toward distal ends that terminate in a restraining area. The restraining area can be sized and shaped to prevent transverse insertion or extraction of the clasp through the restraining area. The clasp can be axially moveable through closed arms when the closed arms are in a relaxed configuration. The article cushion can be positionable in the seat area of the clasp to provide a cushioned interface between the seat area of the clasp and a substantially rigid target component.

In accordance with another aspect of the technology, a method is provided of providing a cushioned interface between a substantially rigid clasp having a seat area and a substantially rigid target component to be seated in the seat area. The method can include axially sliding the clasp within a channel of a resilient article cushion and through a closed bracket having a pair of pliable, closed arms extending away from the channel toward distal ends that terminate in a restraining area. The cushion can be slidably positioned above the clasp on a side of the clasp opposing the seat of the clasp, with the restraining area being positioned within the seat area. The cushion can be rotated into position within the seat of clasp, with the restraining area positioned outside of the seat area. The clasp can be transversely positioned through a receiving gap of an openable bracket of the cushion, the openable bracket having a pair of pliable, openable arms extending away from the channel toward distal ends that terminate in the receiving gap. The clasp can be attached to the target component with the cushion positioned between the seat of the clasp and the target component.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 1 is a perspective view of an article cushioning interface in accordance with an aspect of the technology;

FIG. 2 is an end view of the article cushion of FIG. 1;

FIG. 3 is a side view of the article cushion of FIG. 1;

DETAILED DESCRIPTION

Figure 4:
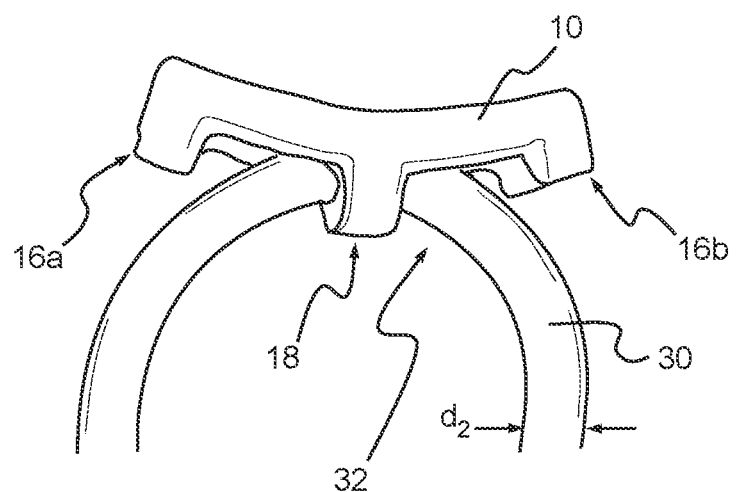
FIG. 4 is a perspective view of a U-bolt having an article cushion attached thereto, shown with the article cushion in a rotated position.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to an "article cushion" can include one or more of such cushions, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms can sometimes be used herein to describe and claim various components of the present invention. Such terms include, without limitation, "lower," "higher," "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art in the context of this disclosure.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to systems and methods that provide a cushioned interface between two generally rigid components. The present technology can be advantageous in the interface between a U-bolt and a bar or strut on a vehicle, between line shackles and another component, between shackles of padlocks and another component, etc. The present technology can be utilized to improve the grip interface between such rigid bodies, to reduce vibration as a result of movement, and to limit or eliminate scratching or marring of one component by another.

The article cushions of the present technology are both easy to install on a desired component and, once installed, resist inadvertent movement or removal of the cushion. Conventional devices that attempt to provide the same function can be very difficult to install, and, as such, are difficult to reposition or reuse on another device. When such devices are easy to install, they can also very easily be removed under load, or can slide out of position when not desired. In contrast, the present technology can be easily installed, easily removed or interchanged when desired, but provides a cushion that remains securely in position during use.

As shown generally in FIGS. 1-3, in accordance with one embodiment, the present technology provides an article cushion 10 that can include a body 12 formed generally from a resilient material. The body can be relatively easily bent or twisted, but tends to return to an initial configuration when released. Suitable materials from which the body can be formed can include, without limitation, nylon, thermoplastic polyurethane, or the like. The body can define an elongate channel 14 extending into, or through, or formed therein. The channel can be sized to receive therein a portion of a seat (32 in FIGS. 4-6) of a substantially rigid clasp (30 in FIGS. 4-6).

The cushion 10 can include at least one openable bracket (two are shown at 16a, 16b) that can include a pair of pliable, openable arms 17a, 17a'. The openable arms can extend away from the channel 14 toward distal ends that terminate in a receiving gap 21 (FIGS. 1 and 2). The receiving gap can have a width "$d_1$" (FIG. 2) that is smaller than a cross-section or outer diameter "$d_2$" of the clasp (FIG. 4). While the receiving gap is smaller than the cross-section of the clasp, due to the resilience of the arms the clasp can be insertable transversely through this receiving gap when the openable arms are in a splayed configuration, with the openable arms securing the clasp therebetween when the open arms are later returned to a relaxed configuration.

As those terms are used herein, "transversely" refers to a direction generally orthogonal to the longitudinal channel 14. Thus, when the clasp is inserted or extracted from the receiving gap 21 formed by the openable arms 17a, 17a', it is moved upwardly away from or downwardly toward the longitudinal channel. When the clasp is inserted or moved "axially" relative to a bracket 16, 18, it is slid along the longitudinal channel in the same direction of extension of the longitudinal channel. Thus, for example, when a bracket is "closed," as defined further below, the clasp can only move axially relative to that bracket, as the closed bracket prevents it from moving transversely to the bracket.

Figure 5:
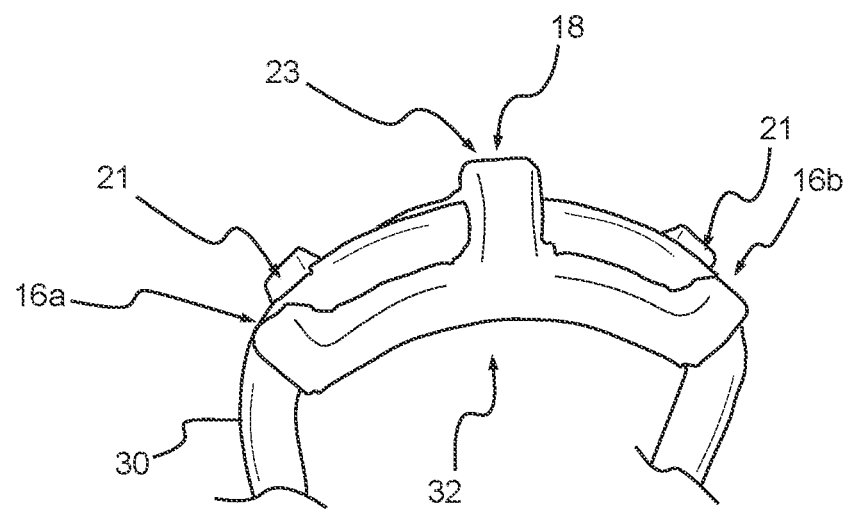
FIG. 5 is a perspective view of the article cushion and U-bolt of FIG. 4, shown with the article cushion in an installed position.

The cushion 10 can include at least one closed bracket 18 having a pair of pliable, closed arms 19, 19a extending away from the channel toward distal ends that terminate in a restraining area 23 (FIGS. 2 and 5). The restraining area can be sized and shaped to prevent transverse insertion or extraction of the clasp through the restraining area. In this manner, the clasp is axially moveable through the closed arms: however, the clasp is prevented from moving transversely out of the restraining area.

Figure 6:
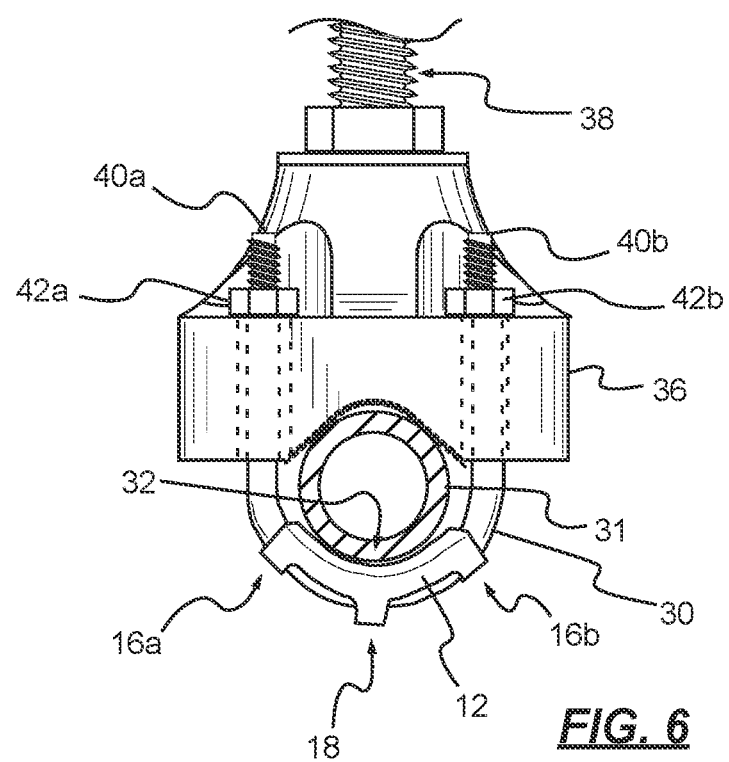
FIG. 6 is a side view of a component of a vehicle having an article holding base attached thereto, with the article cushion installed between the vehicle component and a U-bolt attaching the holding base to the vehicle component.

The present technology thus provides a cushioned interface between two generally rigid, metallic components. The cushion is relatively easy to install, reposition, replace or interchange, yet maintains its position well once installed. The cushion can be used in a variety of applications in which a U-shaped (or even square-shaped) connector is to be attached to another, rigid device. FIG. 6 shows one exemplary application. In this example, an article holder (e.g., tool holder, rifle holder or the like) 38 can be secured to a base 36, as is known in the art. When desired to attach the base to a target component, such as that shown at 31, oftentimes a pair of U-bolts are used. One bolt 30 is shown, but another bolt would generally be used behind the base 36. Threaded ends 40a, 40b of the U-bolt receive nuts 42a, 42b, which can be cinched tightly against the base to cinch the target component 31 tightly into the base and tightly into the seat 32 of the U-bolt. The cushion 10 can provide a cushioned interface between the clasp 30 of the U-bolt and the target component 31. The target component is thereby protected from overtightening of the U-bolts, from scratching, marring, denting, etc.

The target component can be any component to which it is desired to attach a clasp. On vehicles, this is often a section of handlebars, a portion of a luggage rack, cargo rack, roll cage bar, etc. In the example shown, the target component includes a round cross-section. However, the target component can be any of a variety of shapes that interface with a clasp 30 like that shown, such as a square or rectangular tube or bar. In addition, while the clasp 30 is shown having a rounded seat area, the clasp can include a square-shaped profile, triangular profile, etc. Due to the flexibility of the body 10, it can be utilized with a variety of target component and clasp profiles.

In the example shown in FIG. 2, the restraining area 23 formed by arms 19, 19a is shown having a gap size width "$d_3$" smaller than the size "$d_1$" of the receiving gap 21 of bracket 16a. The size of the restraining area gap can vary, but is generally chosen so that transverse insertion or removal of the clasp 30 is not possible through this area. Thus, as represented by the cross-hatching, the size of that gap can be varied, depending upon the size of the body, the pliable arms, the clasp, etc. In one embodiment, the size of the restraining area gap is essentially zero, as the arms 19, 19a can be coupled to one another, formed integrally with one another, or the like. In other words, so long as the clasp 30 can move axially within bracket 18, the restraining area need only prevent transverse movement of the clasp, and can be completely closed. This is the arrangement shown in most of the remaining figures.

In one example, shown in FIGS. 1-3, the cushion 10 can include a series of engagement teeth 44 formed on a side of the cushion opposite the openable and closed brackets. The engagement teeth can be operable to frictionally engage the target component seated in the seat area of the clasp. While the teeth shown include a generally angular cross-section, they can be formed from rounded protrusions, circular nubs, and the like. In the case where the teeth are formed from the same pliable material as the rest of the body, they are generally pliable as well.

One advantage provided by the present technology is that the cushion remains in place through a variety of load cycles while also being relatively easily installed, interchanged, etc. FIGS. 4 and 5 illustrate one manner of installing the cushion 10. In this embodiment, the clasp 30 can be axially slid within the channel 14 of the cushion and through the closed bracket 18. The cushion can initially be installed in an orientation opposite that in which it will be installed during use. Once installed through closed bracket, it can easily be slid above the clasp on a side of the clasp opposing the seat of the clasp, with the restraining area being positioned within the seat area, as shown in FIG. 4 (e.g., in an "upside down" position). Using a single closed bracket can sufficiently retain the cushion on the clasp, but still allows easy movement of the cushion along the clasp.

Once in this position, the cushion 10 can be rotated into position within the seat of clasp, with the restraining area of bracket 18 now positioned outside of the seat area. Once in this position, the clasp can be easily "snapped" through the receiving gap of brackets 16a, 16b. In other words, the clasp can be transversely positioned through the receiving gaps and the cushion is now ready for use and will maintain its installed configuration throughout usual load cycles. If it is desired to remove or interchange the cushion, the steps above can easily be reversed to easily remove the cushion.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

We claim:

1. An attachment assembly, comprising:
   a substantially rigid clasp having a seat;
   a substantially rigid target component, receivable within the seat of the clasp;
   an article cushion including:
      a body formed from a resilient material;
      an elongate channel defined in the body, the channel sized to receive therein a portion of the seat of the clasp;
      at least one openable bracket having a pair of pliable, openable arms extending away from the channel toward distal ends that terminate in a receiving gap, the receiving gap having a width smaller than a cross-section of the clasp, the clasp being insertable transversely through the receiving gap when the openable arms are in a splayed configuration, with the openable arms securing the clasp therebetween when the open arms are in a relaxed configuration; and at least one closed bracket having a pair of pliable, closed arms extending away from the channel toward distal ends that terminate in a restraining area, the restraining area being sized and shaped to prevent transverse insertion or extraction of the clasp through the restraining area, the clasp being axially moveable through the closed arms when the closed arms are in a relaxed configuration;

the article cushion being positionable in the seat area of the clasp to provide a cushioned interface between the seat area of the clasp and the article.

2. The assembly of claim 1, wherein the restraining area includes a restraining gap defined between the distal ends of the closed arms, the restraining gap being smaller in width than a width of the receiving gap.

3. The assembly of claim 1, wherein the distal ends of the closed arms are joined to one another in the restraining area.

4. The assembly of claim 1, wherein the distal ends of the closed arms are formed integrally with one another in the restraining area.

5. The assembly of claim 1, wherein the cushion further includes a series of engagement teeth, formed on a side of the cushion opposite the openable and closed brackets, the engagement teeth operable to frictionally engage the target component seated in the seat area of the clasp.

6. The assembly of claim 1, further comprising a second openable bracket, displaced longitudinally along the body from the openable bracket.

7. The assembly of claim 6, wherein the openable bracket and the second openable bracket are positioned on opposite sides of the closed bracket.

8. The assembly of claim 1, wherein the clasp comprises a rounded portion of a U-bolt.

9. An article cushion, comprising:
a body formed from a resilient material;
an elongate channel defined in the body, the channel sized to receive therein a portion of a seat of a substantially rigid clasp;
at least one openable bracket having a pair of pliable, openable arms extending away from the channel toward distal ends that terminate in a receiving gap, the receiving gap having a width smaller than a cross-section of the clasp, the clasp being insertable transversely through the receiving gap when the openable arms are in a splayed configuration, with the openable arms securing the clasp therebetween when the open arms are in a relaxed configuration; and
at least one closed bracket having a pair of pliable, closed arms extending away from the channel toward distal ends that terminate in a restraining area, the restraining area being sized and shaped to prevent transverse insertion or extraction of the clasp through the restraining area, the clasp being axially moveable through closed arms when the closed arms are in a relaxed configuration;
the article cushion being positionable in the seat area of the clasp to provide a cushioned interface between the seat area of the clasp and a substantially rigid target component.

10. The cushion of claim 9, wherein the restraining area includes a restraining gap defined between the distal ends of the closed arms, the restraining gap being smaller in width than a width of the receiving gap.

11. The cushion of claim 9, wherein the distal ends of the closed arms are integrally formed with one another in the restraining area.

12. The cushion of claim 9, wherein the cushion further includes a series of engagement teeth, formed on a side of the cushion opposite the openable and closed brackets, the engagement teeth operable to frictionally engage a target component seated in the seat area of the clasp.

13. The cushion of claim 9, further comprising a second openable bracket, displaced longitudinally along the body from the openable bracket.

14. The cushion of claim 13, wherein the openable bracket and the second openable bracket are positioned on opposite sides of the closed bracket.

15. A method of providing a cushioned interface between a substantially rigid clasp having a seat area and a substantially rigid target component to be seated in the seat area, the method comprising:
axially sliding the clasp within a channel of a resilient article cushion and through a closed bracket having a pair of pliable, closed arms extending away from the channel toward distal ends that terminate in a restraining area;
slidably positioning the cushion above the clasp on a side of the clasp opposing the seat of the clasp, with the restraining area being positioned within the seat area;
rotating the cushion into position within the seat of clasp, with the restraining area positioned outside of the seat area;
transversely positioning the clasp through a receiving gap of an openable bracket of the cushion, the openable bracket having a pair of pliable, openable arms extending away from the channel toward distal ends that terminate in the receiving gap; and
attaching the clasp to the target component with the cushion positioned between the seat of the clasp and the target component.

16. The method of claim 15, wherein the restraining area of the cushion includes a restraining gap defined between the distal ends of the closed arm, the restraining gap being smaller in width than a width of the receiving gap.

17. The method of claim 15, wherein the distal ends of the closed arms of the cushion are integrally formed with one another in the restraining area.

18. The method of claim 15, wherein the cushion further includes a series of engagement teeth, formed on a side of the cushion opposite the openable and closed brackets, the engagement teeth operable to frictionally engage the target component seated in the seat area.

19. The method of claim 15, wherein the cushion includes a second openable bracket, and wherein transversely positioning the clasp through the receiving gap of the openable bracket of the cushion further includes transversely positioning the clasp through a receiving gap of the second openable bracket.

20. The method of claim 19, wherein the openable bracket and the second openable bracket are poisoned on opposite sides of the closed bracket.

* * * * *